(12) United States Patent
Ross

(10) Patent No.: US 8,550,196 B2
(45) Date of Patent: Oct. 8, 2013

(54) MULTIPLE INDUCTION ELECTRIC MOTOR AND VEHICLE

(75) Inventor: Robert Ross, Harlingen, TX (US)

(73) Assignee: New Core, Inc., Harlingen, TX (US)

( * ) Notice: Subject to any disclaimer, the term of this patent is extended or adjusted under 35 U.S.C. 154(b) by 107 days.

(21) Appl. No.: 13/394,206

(22) PCT Filed: Aug. 27, 2010

(86) PCT No.: PCT/US2010/046913
§ 371 (c)(1),
(2), (4) Date: Mar. 5, 2012

(87) PCT Pub. No.: WO2011/025918
PCT Pub. Date: Mar. 3, 2011

(65) Prior Publication Data
US 2012/0186888 A1    Jul. 26, 2012

Related U.S. Application Data

(60) Provisional application No. 61/238,495, filed on Aug. 31, 2009.

(51) Int. Cl.
*B60W 10/08* (2006.01)

(52) U.S. Cl.
USPC ....... 180/65.285; 903/906; 310/114; 318/808

(58) Field of Classification Search
USPC ............... 180/65.285, 65.21, 65.1; 903/906; 310/112, 114, 211, 212; 318/807, 808, 318/503, 727
See application file for complete search history.

(56) References Cited

U.S. PATENT DOCUMENTS

| | | | |
|---|---|---|---|
| 5,359,228 A | 10/1994 | Yoshida | |
| 5,677,582 A | 10/1997 | Lutz et al. | |
| 5,894,182 A | 4/1999 | Saban et al. | |
| 6,034,456 A | 3/2000 | Osama et al. | |
| 6,242,884 B1 * | 6/2001 | Lipo et al. | 318/808 |
| 6,278,211 B1 | 8/2001 | Sweo | |
| 6,809,453 B2 * | 10/2004 | Narita et al. | 310/216.008 |
| 6,909,215 B2 | 6/2005 | Bryant | |

(Continued)

FOREIGN PATENT DOCUMENTS

| | | |
|---|---|---|
| EP | 0 004 194 A1 | 9/1979 |
| EP | 0 438 442 B1 | 7/1991 |

(Continued)

OTHER PUBLICATIONS

International Search Report, dated Oct. 20, 2010, PCT Application No. PCT/US10/46913, 11 pages.

(Continued)

*Primary Examiner* — John Walters
(74) *Attorney, Agent, or Firm* — Roylance, Abrams, Berdo and Goodman, LLP

(57) ABSTRACT

A novel multiple induction electric motor and vehicle that stores electrical power; provides a first and second direct current power input from the stored electrical power; separately produces first and second synchronized variable frequency alternating current control signal from the first and second direct current power inputs, respectively; produces first and second synchronized rotating magnetic fields responsive to the first and second variable frequency alternating current control signals, respectively; induces a first induced magnetic field around a conductor in a first inductive rotor responsive to the first rotating magnetic field; induces a second induced magnetic field around a conductor in a second inductive rotor responsive to the second rotating magnetic field; applies first and second rotational forces between the first and second rotating magnetic fields and the first and second induced magnetic fields to the shaft; and transmits the first and second rotational forces to a drive wheel.

40 Claims, 7 Drawing Sheets

(56) References Cited

U.S. PATENT DOCUMENTS

| | | |
|---|---|---|
| 2004/0061396 A1 | 4/2004 | Narita et al. |
| 2009/0127971 A1 | 5/2009 | Ishizeki et al. |

FOREIGN PATENT DOCUMENTS

| | | |
|---|---|---|
| TW | M344268 | 11/2008 |
| WO | 2007118082 A2 | 10/2007 |
| WO | WO 2007118082 A2 * | 10/2007 ............. B62D 21/11 |

OTHER PUBLICATIONS

Written Opinion of the International Searching Authority, dated Oct. 20, 2010, PCT Application No. PCT/US10/46913, 9 pages.

* cited by examiner

MULTIPLE INDUCTION ELECTRIC MOTOR AND VEHICLE

TECHNICAL FIELD

The present invention relates generally to electric motors, and more specifically to induction motors as used in electrically powered vehicles.

BACKGROUND

Opposition to reliance on non-renewable sources of energy to power our transportation sector has been yearly growing stronger along with opposition to dependence on foreign supplies of energy. The United States has long relied on petroleum products to power its transportation. However, in the last 60 years, the U.S. has gone from being energy independent to relying 70% on foreign sources of energy. Alternatives are being sought that reduce our dependence on foreign petroleum based products out of environmental and security concerns. Vehicles fully or partially powered by electricity offer a solution to these concerns.

A major hurdle in designing large electrically-powered road vehicles involves the traction motor. 3-phase alternating current induction motors are sturdy and reliable. They are capable of efficient transformation of electric power to mechanical motion. However, conventional alternating current (AC) motors require high voltage and current levels to achieve the output torque necessary to move a large vehicle in a satisfactory manner. Fulfilling these requirements can increase the risk to safety, and place higher demands on the motor drive controller's protective circuits. High operating temperatures impede the flow of current in the stator and rotor, leading to inefficient motor operation. Additionally, the overall lifetime of a motor's iron and insulation is increased by 50% for every 10 degrees Fahrenheit the motor's operating temperature is reduced.

Integrating multiple smaller AC induction motors on a common shaft has not been an effective solution to the problems presented by large AC induction motors due to the precision of manufacturing and complexity of control necessary to avoid dissimilar behavior of integrated motors resulting in reverse torque pulses and excessive vibration.

An additional problem in electrically-powered road vehicles is that in removing the combustion engine one removes the primary driver of systems critical to the safe operation of a large vehicle, especially the power steering pump and the air brakes. The combustion engine also provided for long range travel using an energy-dense fuel. Current battery technology cannot rival the energy densities seen in fossil fuels, and so no electric vehicle has yet had a driving range comparable to a similarly sized gasoline vehicle.

Electric motors have served as a primary means for propulsion in some wheeled vehicles for over a century by now, with many designs incorporating multiple sources of electrical energy, along with multiple sources of propulsion. The hybrid vehicle concept is not new. What has changed over the past century are the motor units providing the propulsion, the controls driving the motor units, the capabilities of various new energy storage technologies, and the devices assisting in the operation of modern vehicles.

U.S. Pat. No. 6,909,215 issued to Bryant describes a motor on whose shaft is mounted a number of motor modules operating on reluctance, each of which consists of two disc-shaped rotors sandwiching a disc shaped coil, increasing complexity of construction of the motors and control systems for increased flexibility without providing the safety and redundancy benefits at high power levels provided by the present invention.

U.S. Pat. No. 7,397,156 issued to Mukai et al describes a tandem rotary electric machine having a primary and secondary rotor. Mukai further describes that the secondary rotor operates at a much higher voltage than the primary rotor and operates only intermittently. The device described by Mukai does not address the problem of coupling electric motors to produce high power levels with safety and redundancy.

U.S. Pat. No. 6,034,456 issued to Osama et al describes a bearing less machine drive having two rotors that are electrically and mechanically coupled to each other through a common end ring. The device disclosed by Osama does not address the problem of coupling electric motors to produce high power levels efficiently that is addressed by the present invention. The device disclosed by Osama instead couples two rotors both mechanically and electrically to achieve stable levitation. This does not provide the benefits of high power output and increased efficiency.

A 1918 patent issued to Beach, U.S. Pat. No. 1,275,201 provides an example of the hybrid vehicle's history. The vehicle described by Beach is propelled by an electric motor powered by both a battery and an engine generator unit. Thus Beach describes a single driving source with hybrid power sources. Beach uses a direct current motor and does not provide a safe and redundant high power electric motor.

A 1974 patent issued to Waldorf, U.S. Pat. No. 3,792,327, describes a hybrid electric vehicle drive. The device described in Waldorf's patent differs from previous designs in his elaboration of the engine generator unit's operation. However the Waldorf design is limited to the control system for a generator in a hybrid vehicle and does not provide a safe and redundant high power electric motor.

A 1975 patent issued to Eastham, U.S. Pat. No. 3,866,703, includes improvements to the vehicle's transmission and control pedals. Though Eastham includes an AC induction motor and regenerative braking, he relies on conventional induction motors. As a result, Eastham's design suffers from the same problems as previous designs.

DISCLOSURE OF THE INVENTION

It is an object of this invention to present a novel vehicle configuration that satisfies the demands commonly placed on today's large public transportation vehicles. Examples of this invention introduce redundancy into an electric motor's construction. For example, the disability caused by a wire winding short is only 50% of the total power output of the motor. Additionally, examples of this invention utilize a multitude of smaller more economically accessible motor drive controllers, in a modular fashion, enabling cooperative operation of two motor units to act as one large electric traction motor.

According to a first example of the invention, a process is provided for turning a shaft. The process comprises: receiving a first direct current power input; receiving a second direct current power input; producing a first variable frequency alternating current control signal from the first direct current power input; separately producing a second variable frequency alternating current control signal from the second direct current power input, synchronized to the first variable frequency alternating current control signal; producing a first rotating magnetic field responsive to the first variable frequency alternating current control signal; producing a second rotating magnetic field, responsive to the second variable frequency alternating current control signal and synchronized to the first rotating magnetic field; inducing a first induced magnetic field around a conductor in a first inductive rotor, responsive to the first rotating magnetic field; inducing a second induced magnetic field around a conductor in a second inductive rotor, responsive to the second rotating magnetic field; applying a first rotational force between the first rotating magnetic field and the first induced magnetic field to the shaft; and applying a second rotational force between the second rotating magnetic field and the second induced magnetic field to the shaft.

According to another example of the invention, a system is provided for turning a shaft. The system comprises: means for receiving a first direct current power input; means for receiving a second direct current power input; means for producing a first variable frequency alternating current control signal from the first direct current power input; means for separately producing a second variable frequency alternating current control signal from the second direct current power input, synchronized to the first variable frequency alternating current control signal; means for producing a first rotating magnetic field responsive to the first variable frequency alternating current control signal; means for producing a second rotating magnetic field, responsive to the second variable frequency alternating current control signal and synchronized to the first rotating magnetic field; means for inducing a first induced magnetic field around a conductor in a first inductive rotor, responsive to the first rotating magnetic field; means for inducing a second induced magnetic field around a conductor in a second inductive rotor, responsive to the second rotating magnetic field; means for applying a first rotational force between the first rotating magnetic field and the first induced magnetic field to the shaft; and means for applying a second rotational force between the second rotating magnetic field and the second induced magnetic field to the shaft. In some such systems, the means for receiving a first direct current power input and the means for producing a first variable frequency alternating current control signal comprise a first variable frequency motor drive controller and the means for receiving a second direct current power input and the means for separately producing a second variable frequency alternating current control signal comprise a second variable frequency motor drive controller. In at least one such system, the means for producing a first rotating magnetic field comprises a first stator; the means for producing a second rotating magnetic field comprises a second stator; the means for inducing the first induced magnetic field comprises the first inductive rotor; and the means for inducing the second induced magnetic field comprises the second inductive rotor. In at least some such systems, the first and second stator each comprise an open slot stator. In many systems, the first stator further comprises a plurality of stator laminates stacked together; and the second stator further comprises a plurality of stator laminates stacked together. In some such systems the stator has a stacking factor of at least 98 percent. In one system, the first and second stator each comprises M19 C5 core plate steel. In at least one such system, the stator has a stacking factor of at least 98 percent. In some systems, the plurality of stator laminates of the first stator are rotated approximately 180 degrees relative to adjacent stator laminates; and the plurality of stator laminates of the second stator are rotated approximately 180 degrees relative to adjacent stator laminates. In many systems, the first and second stator each further comprises form wound wire windings. Form wound wire windings are wire windings comprised of rectangular wire. In some examples, these wire windings have been exposed to varnish vacuum pressure impregnation. In some examples, the varnish is epoxy varnish. In many systems, the means for applying a first rotational force between the first rotating magnetic field and the first induced magnetic field to the shaft comprises a first rotor rigidly joined to the shaft; and the means applying a second rotational force between the second rotating magnetic field and the second induced magnetic field to the shaft comprises a second rotor rigidly joined to the shaft. In many systems, the first and second rotors each comprise a squirrel cage rotor.

In many systems, the first rotor further comprises a plurality of rotor laminates stacked together; the second rotor further comprises a plurality of rotor laminates stacked together; and the first and second rotors each has a stacking factor of at least 98 percent. In at least one such example, the first and second rotors each comprise M19 C5 core plate steel laminates. In some examples, the plurality of rotor laminates of the first rotor are rotated approximately 180 degrees relative to adjacent rotor laminates; and the plurality of rotor laminates of the second rotor are rotated approximately 180 degrees relative to adjacent rotor laminates. In some examples, the means for applying a first rotational force between the first rotating magnetic field and the first induced magnetic field to the shaft comprises the first inductive rotor rigidly joined to the shaft; and the means applying a second rotational force between the second rotating magnetic field and the second induced magnetic field to the shaft comprises the second inductive rotor rigidly joined to the shaft. In at least one example, the first and second rotors are each joined to the shaft with a 0.004 inch interference fit.

According to another example of the invention, a system is provided for turning a shaft. The system comprises: a first variable frequency motor drive controller; a second variable frequency motor drive controller synchronized to the first variable frequency motor drive controller; a first stator positioned and arranged to receive a first variable frequency alternating current control signal from the first variable frequency motor drive controller; a second stator positioned and arranged to receive a second variable frequency alternating current control signal from the second variable frequency motor drive controller; a first inductive rotor responsive to the first stator and rigidly joined to the shaft; and a second inductive rotor responsive to the second stator and rigidly joined to the shaft. In some such systems the first and second stator each comprises an open slot stator. In many systems the first stator comprises a plurality of stator laminates stacked together; and the second stator further comprises a plurality of stator laminates stacked together. In some systems the first and second stator each has a stacking factor of at least about 98 percent. In some systems, the first and second stator each comprises M19 C5 core plate steel laminates. In at least one such system, the plurality of stator laminates are rotated approximately 180 degrees relative to adjacent stator laminates. In many systems the first and second stator each further comprises form wound wire windings. In some systems the first rotor and second rotor each comprises a squirrel cage rotor.

In many systems, the first rotor and second rotor each further comprises a plurality of rotor laminates stacked together. In some such systems the first rotor and second rotor each have a stacking factor of at least about 98 percent. In at least one such system the first rotor and second rotor each comprises M19 C5 core plate steel laminates. In some examples, the plurality of rotor laminates of the first rotor are rotated approximately 180 degrees relative to adjacent rotor laminates; and the plurality of rotor laminates of the second rotor are rotated approximately 180 degrees relative to adjacent rotor laminates. In at least one system, the mechanical joining of the first rotor and second rotor to the shaft further comprises a 0.004 inch interference fit.

According to another example of the invention, a process is provided for propelling a vehicle. The process comprises: storing electrical power; providing a first direct current power input from the stored electrical power; providing a second direct current power input from the stored electrical power; producing a first variable frequency alternating current control signal from the first direct current power input; separately producing a second variable frequency alternating current control signal from the second direct current power input, synchronized to the first variable frequency alternating current control signal; producing a first rotating magnetic field responsive to the first variable frequency alternating current control signal; producing a second rotating magnetic field, responsive to the second variable frequency alternating current control signal, synchronized to the first rotating magnetic field; inducing a first induced magnetic field around a conductor in a first inductive rotor responsive to the first rotating magnetic field; inducing a second induced magnetic field around a conductor in a second inductive rotor responsive to the second rotating magnetic field; applying a first rotational force between the first rotating magnetic field and the first induced magnetic field to the shaft; applying a second rotational force between the second rotating magnetic field and the second induced magnetic field to the shaft; and transmitting the first and second rotational forces to a drive wheel. Many processes further comprise: recharging the stored electrical power. Some processes further comprise: generating electrical power; augmenting the first direct current power input with the generated electrical power; and augmenting the second direct current power input with the generated electrical power. Some processes further comprise: powering auxiliary systems. Many processes further comprise: slowing the vehicle. Some processes further comprise recharging the stored electrical power from the generated electrical power.

According to another example of the invention, a vehicle is provided. The vehicle comprises: means for supporting a load; at least one means for propelling the means for carrying a load by applying rotational motion to the ground and carrying at least a portion of the means for supporting a load; means, mounted on the means for supporting a load, for storing electrical power; means, mounted on the means for supporting a load, for providing a first direct current power input from the stored electrical power; means, mounted on the means for supporting a load, for providing a second direct current power input from the stored electrical power; means, mounted on the means for supporting a load, for producing a first variable frequency alternating current control signal from the first direct current power input; means, mounted on the means for supporting a load, for separately producing a second variable frequency alternating current control signal from the second direct current power input, synchronized to the first variable frequency alternating current control signal; means, mounted on the means for supporting a load, for producing a first rotating magnetic field responsive to the first variable frequency alternating current control signal; means, mounted on the means for supporting a load, for producing a second rotating magnetic field, responsive to the second variable frequency alternating current control signal, synchronized to the first rotating magnetic field; means, mounted on the means for supporting a load, for inducing a first induced magnetic field around a conductor in a first inductive rotor responsive to the first rotating magnetic field; means, mounted on the means for supporting a load, for inducing a second induced magnetic field around a conductor in a second inductive rotor responsive to the second rotating magnetic field; means, mounted on the means for supporting a load, for applying a first rotational force between the first rotating magnetic field and the first induced magnetic field to the shaft; means, mounted on the means for supporting a load, for applying a second rotational force between the second rotating magnetic field and the second induced magnetic field to the shaft; and means for converting the first and second rotational forces to the at least one means for propelling the means for carrying a load by applying rotational motion to the ground.

In many such vehicles, the means for producing a first variable frequency alternating current control signal comprises a first variable frequency motor drive controller; and the means for separately producing a second variable frequency alternating current control signal comprises a second variable frequency motor drive controller. In some vehicles, the means for providing a first direct current power input from the stored electrical power comprise a first lead connecting the means for storing electrical energy to the first variable frequency motor drive controller; and the means for providing a second direct current power input from the stored electrical power comprise a second lead connecting the means for storing electrical energy to the second variable frequency motor drive controller.

In many such vehicles, the means for producing a first rotating magnetic field; means for producing a second rotating magnetic; the means for inducing a first induced magnetic field responsive to the first rotating magnetic field; the means for inducing a second induced magnetic field responsive to the second rotating magnetic field; the means for applying a first rotational force between the first rotating magnetic field and the first induced magnetic field to the shaft; and the means for applying a second rotational force between the second rotating magnetic field and the second induced magnetic field to the shaft are as described in systems for turning shafts described above.

Some vehicles further comprise: means, mounted on the means for supporting a load, for recharging the stored electrical power. In some such vehicles, the means for recharging the stored electrical power further comprises: means for generating electrical power. In some such vehicles, the means for generating electrical power comprises a generator. In at least one such example, the generator further comprises an internal combustion engine. In many vehicles, the means for storing electrical power comprises a battery. In some such vehicles, the means for storing electrical power further comprises a plurality of batteries in series. In many vehicles, the means for converting the first and second rotational forces to rotation of a drive wheel comprises a transmission. In some vehicles, the transmission further comprises an automatic transmission. In some vehicles the transmission further comprises a differential.

Some vehicles further comprise: means, mounted on the means for supporting a load, for generating electrical power; means for augmenting the first direct current power input with the generated electrical power; and means for augmenting the second direct current power input with the generated electrical power. In some such vehicles, the means for generating electrical power comprises a generator. In some vehicles, the means for augmenting the first direct current power input with the generated electrical power comprises a third power lead connecting the generator to the first variable frequency motor drive controller; and the means for augmenting the second direct current power input with the generated electrical power comprises a fourth power lead connecting the generator to the second variable frequency motor drive controller. In some such vehicles, the first drive controller and the second drive controller are responsive to a torque control positioned and arranged to receive input from an operator. Some vehicles further comprise, an auxiliary electric motor mounted on the means for supporting a load. In some such vehicles, the auxiliary electric motor is mechanically coupled to an alternator and a mechanical pump. Some vehicles further comprise a means for slowing the vehicle. In some such vehicles, the means for slowing the vehicle comprises a friction brake. In some vehicles, the means for slowing the vehicle further comprises a means for generating electrical power. In many vehicles, the means for supporting a load further comprises, a chassis. In some such vehicles the chassis further comprises a frame. In some vehicles, the chassis further comprises a unibody.

In some vehicles, the means for propelling the means for carrying a load comprises a drive wheel. In one such vehicle, the drive wheel is mounted on an axle mounted to the means for supporting a load. In some vehicles the means for supporting a load further comprises, a chassis; the means for propelling the means for carrying a load comprises a drive wheel; the means for recharging the stored electrical power further comprises a generator; and the means for storing electrical power comprises a battery; the means for converting the first and second rotational forces to the means for propelling comprises a transmission. In many vehicles, the first variable frequency motor drive controller and the second variable frequency motor drive controller are responsive to a torque control positioned and arranged to receive input from an operator.

According to another aspect of the invention, a vehicle is provided. The vehicle comprises: a chassis, a drive wheel carrying at least a portion of the chassis; a first electrical power storage mounted on the chassis; a first variable frequency motor drive controller positioned and arranged to receive direct current power from the first electrical power storage; a second variable frequency motor drive controller positioned and arranged to receive direct current power from the first electrical power storage, synchronized to the first variable frequency motor drive controller; a first stator positioned and arranged to receive a first variable frequency alternating current control signal from the first variable frequency motor drive controller; a second stator positioned and arranged to receive a second variable frequency alternating current control signal from the second variable frequency motor drive controller; a first inductive rotor responsive to the first stator and rigidly joined to the shaft; a second inductive rotor responsive to the second stator and rigidly joined to the shaft; and a transmission coupling the shaft to the drive wheel. In many such vehicles, the first and second stators; and the first and second rotors are as described with respect to systems for turning a shaft described above.

Some vehicles further comprise: an electrical power generator mounted on the chassis providing direct current electrical power to the first and second variable frequency motor drive controllers. In some vehicles, the electrical power storage comprises a battery; and the electric power generator comprises a propane powered generator. In some vehicles, the first motor drive controller and the second motor drive controller are responsive to a torque control positioned and arranged to receive input from an operator. Some vehicles further comprise an auxiliary electric motor, mounted on the chassis, powering auxiliary systems. Some vehicles further comprise: a generator positioned and arranged to recharge the battery. In some vehicles the battery further comprises a plurality of batteries in series. In some vehicles, the transmission further comprises an automatic transmission. Some vehicles further comprise a differential transferring rotational motion form the output of the transmission to the drive wheel.

In some such vehicles, the first motor drive controller and the second motor drive controller are responsive to a torque control positioned and arranged to receive input from an operator. Some vehicles further comprise electrically powered auxiliary systems mounted on the chassis. In some such vehicles, the electrically powered auxiliary systems comprise an electric motor. In some vehicles the electric motor is mechanically coupled to an alternator and a mechanical pump. Some vehicles further comprise a friction brake. In some vehicles the drive wheel is mounted on an axle mounted to the chassis.

Some vehicles further comprise: a means for managing the stored electrical power, mounted on the means for supporting a load, for balancing the charging and discharging of the stored electrical power. In some such vehicles, the means for managing the stored electrical power further comprises: means for monitoring the temperature, voltage level, and operational status of every electrical power storage cell. In some such vehicles, the means for managing the stored electrical power further comprises: means for communicating with other vehicle components. In some such vehicles, the means for monitoring the temperature, voltage level, and operational status of every electrical power storage cell and the means for managing the stored electrical power further comprises: means for communicating with other vehicle components comprise a battery management system. In at least one such example, the battery management system further comprises means for storing records of charge and discharge cycles and means for signaling when the batteries have been discharged.

MODES FOR CARRYING OUT THE INVENTION

Figure 1:
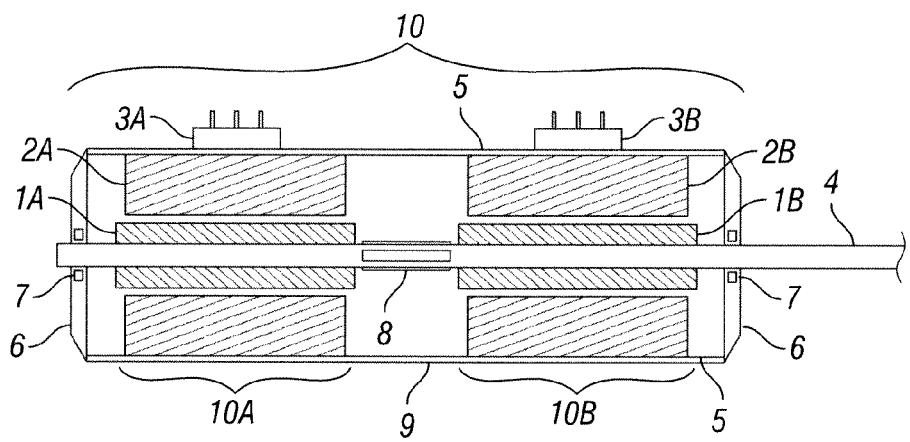
FIG. 1 is a sectional view of an example electric motor.

In at least one example embodiment of the invention, an electric motor is provided that produces higher output power at lower voltage levels than previous designs by mechanically coupling multiple smaller individual motor units along a common shaft inside one large motor housing. In one example, two individual motor units are joined by a common shaft. Each motor unit comprises a rotor-stator pair and variable frequency motor drive controller. The variable frequency motor drive controller provides a variable frequency alternating current to the exciter windings in the stator, setting up a rotating electromagnetic field about the exciter winding in the stator. This rotating magnetic field induces a current flow within a conductive element in the inductive rotor, which creates a magnetic field about that conductive element. The interaction of the rotating and induced magnetic fields results in the rotation of the rotor around the axis of the common shaft. It is this behavior in response to the rotating electromagnetic field that makes the rotor an inductive rotor. Varying the frequency of the alternating current supplied by the motor drive controller controls the speed of the motor by controlling the speed of rotation of the rotating magnetic field. By mechanically joining the common shaft to each rotor, a beneficial summation of power occurs when all rotors are driven to spin in the same direction at the same speed. To achieve this rotation, each motor unit is constructed in a similar fashion, of the same dimensions and materials, and driven by the same type of motor drive controller to produce a synchronized power supply. The motors are operated individually, but avoid a destructive feedback vibration of reverse torque pulses by operating as similarly as possible. The shaft is constructed to insure it can withstand the torque producing capabilities of the combined motors. As a result, for example, two 60 horsepower motors effectively become one 120 horsepower motor. More than two motors may be used in further examples.

In one example embodiment, the multiple induction electric motor provides regenerative braking capability. Specifically, in the example when the rotors are forced to spin faster than the synchronous speed of the stators' energizing fields, a voltage is built up on the stator terminals that can be used to recharge batteries.

In at least one example embodiment, a vehicle configuration is provided that substitutes secondary motors to replace driving forces created by an engine to operate various systems. For example, the power steering pump is run in an example embodiment by an accessory motor instead of the engine driveshaft, and the air brakes are enabled by a battery-powered air compressor instead of relying on the engine exhaust system.

In another example embodiment, a vehicle design is provided that incorporates batteries to power an electric traction motor. In a further example, a generator, preferably running off of propane gas, can be turned on by the vehicle's operator to extend the driving range by both powering the motor directly and by recharging the batteries.

It is an object of various examples of this invention to introduce an electric and a hybrid electric vehicle design capable of propelling a large vehicle, with application to, among other things, public transportation. In at least one example, the tractive power source for the vehicle is a multiple induction AC electric motor, which is powered by batteries only in an electric vehicle configuration, or by batteries at times supplemented with power from an onboard combustion engine generator unit in a hybrid power source vehicle configuration. In at least one example, the multiple induction motor includes two separately operated AC induction motor units joined by their rotors to a common shaft and encased in a common housing. Each motor unit is driven by its own motor drive controller, with both controls being the same model. The motor outputs are beneficially combined along the common shaft by virtue of the motor's duplicate construction and synchronous power supply enabled by the motor controls. Since each motor operates in substantially the same fashion, their outputs are combined, instead of struggling against dissimilar behavior, avoiding destructive reverse torque pulses and vibrations.

In at least one example, the traction motor's output torque is first increased by a torque converter, and then by an automatic transmission. The resultant torque is split by a rear axle differential, and then applied to the driven wheels to propel the vehicle. In one example, the torque converter allows a multiple induction motor to run up to 800 rpm with no load. This aids the multiple induction motor in starting heavy loads from a standstill.

In a further example, the traction motor's primary energy supply is a bank of batteries that are connected in series. In some examples, these batteries are clustered, with the batteries within a cluster connected in series, and with each cluster connected to the next in series. This provides the benefit of flexibility for even distribution of the batteries throughout the vehicle, balancing weight on both sides of the frame, and on both sides of a wheel axle. In some examples these batteries are either lead-acid batteries or lithium-ion batteries. In some examples, the end terminals of the battery series are connected to a common bus, which provides power to and receives power from a multitude of devices.

In one example, the batteries provide direct current (DC) power to the common bus and a DC/AC converter is used to provide the motors with the appropriate AC power. In some examples, this conversion is performed by the variable frequency motor drive controllers. In some examples, the motor generates power during regenerative braking and applies the regenerative charging to the common DC bus for recharging the batteries. In some examples the motor drive controllers perform the AC/DC conversion for recharging.

In further examples, the motor drive controllers receive commands from the vehicle operator via a torque control pedal and a brake pedal. Potentiometers connected to the pedal deliver a voltage signal to both of the motor drive controllers, so that both may act simultaneously to the operator's commands. As the torque control pedal is depressed, the drives respond by providing the motor units with power waveforms that increase the output torque, which can result in an acceleration of the vehicle. As the brake pedal is depressed, a first transition range has the motor drive controllers send power waveforms that force the motor to enter a regenerative braking state, where the rotor causes a voltage to build across the stator windings, which can recharge the batteries. After further depression of the brake pedal, a transition range is reached where the mechanical air braking system is activated, to stop the wheels via friction brake pads.

In still further examples, an accessory motor is powered by the common DC bus. Power cables lead from the common DC bus to the accessory motor drive controller, which drives the motor at a high constant rate. In some examples, the accessory motor is mechanically coupled to an alternator and to a power steering pump. The high constant rate of operation of this motor is used so that a power steering pump assists steering in most driving conditions. An alternator supplies power to recharge an auxiliary battery. In some such examples, an auxiliary battery supplies energy to the vehicle's lighting systems, vehicle operator's cooling fan, and to an air pump that at enables the vehicle's air brakes.

In a further example, a hybrid power configuration embodiment is provided, in which a combustion engine generator unit is included. Fuel from supply tanks is combusted to rotate a generator unit and produce AC power. An AC/DC rectifier applies the generator power to the common DC bus, where it can be used to power the traction motor and to recharge the batteries.

Turning now to a more specific example, FIG. 1 shows a vertical cross section through the center of an example multiple induction motor 10 along the length of the common shaft 4. This example includes two distinct AC induction motor units 10*a* and 10*b*, within the motor 10. Motor unit 10*a* includes rotor 1*a*, stator 2*a*, and junction box 3*a*, while motor unit 10*b* includes rotor 1*b*, stator 2*b*, and junction box 3*b*. Each motor unit operates independently, as there are no shared windings, controls, or common elements shared between the units. However, both rotors 1*a* and 1*b* are rigidly joined to the common shaft 4, allowing a summation of output powers from the motor units when they are operating in synchronization.

In one example, all the motor units of motor 10 are surrounded by a common housing case made up of a main body case 5 and endbells 6. Both stators 2*a* and 2*b* are affixed to the main body case 5 so that no relative motion between the stators and the main body case can occur. Endbells 6 complete the enclosure of the motor units, and have bearings 7 attached to provide rotational support to the common shaft 4.

In the example of FIG. 1 shaft ribbings 8 are attached to the common shaft 4 in areas of additional stress, such as the section of shaft between where the rotors 1a and 1b are joined to the shaft. A cooling jacket 9 is included in the main body case 5 to support thermal regulation of the motor.

Further increases in total power can be achieved in some examples by attaching additional motor units to the common shaft with additional internal supports, such as shaft support bearings, placed between rotors. In further examples, an additional support disc is affixed to the main body case to which the support bearings are attached.

In one specific example, the first and second induction motor units are manufactured within close tolerances to substantially identical specifications. The laminations for the stators and rotors of each motor unit are stamped using forged steel dies to reduce burrs in the laminations. Reducing the burrs in the laminations reduces the irregularities in the thickness of, and increases the magnetic permeability of the stacked laminations because burrs cause the laminations to not stack tightly and uniformly against each other. Also in this example, the inherent variation in thickness of the rotor and stator laminations is accounted for. The laminations are produced from rolled sheet steel that has an inherent variation in thickness of approximately 10% between one edge of the roll and the other. This variation in thickness is dealt with by stacking the laminations with the thick edge of the each lamination aligned with the thin edge of the lamination below it. In this example, the described methods produce a finished piece (rotor or stator) with a stacking factor of at least 98%. This means that at least 98% of the total height of the stacked laminations in the piece is within the theoretical stack height based on the thickness of each lamination multiplied by the number of laminations. In one example of the invention, the laminations are made from steel stock that is eight feet long by 49 inches wide having a thickness of 0.014 inch on one edge and 0.0154 inch on another. Other manufacturing processes will occur to those of skill upon review of this document that do not depart from the invention; for example, automated manufacturing to the tolerances described in this document or even closer tolerances may be used. In some examples, the laminates are made from M19 C5 core plate steel tested using ASTM Designation A34, 25 cm Epstein Method, at 15 Kilogausses and 60 Hertz.

In further examples of the invention, each laminate shows zero core loss when each laminate is subjected to a core loss test at 85,000 lines per square inch to ensure homogeneity of the magnetic flux across the lamination.

In a further example, the stacking pressure applied to the laminates is about 250 pounds per square inch. In another example of the invention, the rotor of the first induction motor unit weighs substantially the same as the rotor of the second induction motor unit. In another example of the invention, the first rotor weighs within one percent of the total weight of the second rotor.

In a further example, the wire windings used in the first and second motor unit are form wound with varnish vacuum pressure impregnation. In one example, the varnish vacuum pressure impregnation comprises, applying as pure a vacuum as possible and, then exposing the wire to pressure of about 95 pounds per square inch for about 2.5 hours. This procedure reduces voids in the insulation of the wire resulting in more uniform construction and electrical response of the first and second stator.

In a further example embodiment, the first and second motor units are not operated above a maximum temperature of 155 degrees Celsius. In another example, the motor units are not operated at higher than 100.02 lines per square inch in the back iron to keep operating temperatures below 155 degrees Celsius.

In further examples of the invention, the rotors are balanced at 600, 900, 1200, 1800, and 3600 rpms and the shaft and all bearing fits are held to a tolerance of 0.0005 inch or less.

In further examples, the tooth density of the stator is 100.46 lines per square inch. The air gap density is 51.33 lines per square inch. And the back iron density is 100.02 lines per square inch. These densities are with the motor operated at 320 volts and 60 hertz.

In one example of the invention, the multiple induction motor is controlled by a variable frequency motor drive controller. In this example, the magnetic flux density in the back iron increases from 0-60 Hertz, and then begins decreasing for frequencies over 60 Hertz. This means that, when operating at over 60 Hertz, the back iron acts as a heat sink, helping to cool the motor.

In further examples, the coils of the stator are wound with flat wire at 875 circular mils per amp.

In one example of the invention, the stacked rotor and/or stator laminations are heat treated to improve permeability. In some such examples, the stacked rotor and/or stator laminations are heated for one hour in an oven containing an oxygen free atmosphere at between 1350 and 1450 degrees Fahrenheit. In one such example, the oxygen free atmosphere is pure nitrogen.

The production and induction of magnetic fields and the application of rotational force to a shaft can be performed by the structures previously discussed for those functions. Storing electrical energy can be accomplished by batteries, fuel cells, and flywheels. Transmitting rotational forces to a drive wheel can be performed by, for example: a conventional transmission, including automatic, manual, and continuously variable transmissions; transaxles; differentials; shafts; geared hubs; and combinations of these structures.

In further examples, methods of propelling a vehicle include recharging stored electrical energy, generating electrical energy, varying the rotating magnetic fields, powering auxiliary systems, and slowing the vehicle. Recharging stored electrical energy can be performed by, for example: connection to electrical grids/infrastructure, including through cables, wall outlets, and battery chargers; generators; dynamos; alternators; solar panels; and an electric motor through regenerative braking. Varying the rotating magnetic fields a can be performed by a wide variety of control circuits and operator controls as more fully discussed in reference to specific example vehicles below. Powering auxiliary systems can be performed by, for example: an electric motor, an internal combustion engine, or a generator. Slowing the vehicle can be performed, for example, by regenerative braking using an electric motor, or friction brakes (such as conventional hydraulic or air braking systems).

In further examples of the invention, an electric generator is provided that produces higher output power at lower input power levels than previous designs by mechanically coupling multiple smaller individual generator units along a common shaft. In a further example, such an electric generator is attached to a wind turbine when only a portion of the individual generator units could be energized at relatively low wind speeds, allowing more efficient generation from a variety of wind conditions. In a further example, such an electric generator is attached to steam turbine where only a portion of the individual generator units could be energized at times of relatively low electricity demand, increasing overall efficiency and reducing emissions from an associated power plant.

In further examples of the invention, an electric motor that produces higher output power at lower voltage levels than previous designs by mechanically coupling multiple smaller individual motor units along a common shaft inside one large motor housing for powering equipment with a risk of damage in the absence of redundant systems. In such examples, each individual motor unit can operate independently and provide a measure of redundancy without installation of entirely duplicative equipment.

In a further example of the invention, an electric motor that produces higher output power at lower voltage levels than previous designs by mechanically coupling multiple smaller individual motor units along a common shaft inside one large motor housing is used to power a locomotive where only some of the individual motor units are energized to power the locomotive on flat terrain and additional individual motor units are energized to provide additional power for climbing grades.

In one example of the invention, an electric motor is provided that produces higher output power at lower voltage levels than previous designs by mechanically coupling multiple smaller individual motor units along a common shaft inside one large motor housing provides propulsion power for a submarine. In this example, only some of the individual motor units are energized to provide power for relatively low speed propulsion and additional individual motor units are energized for relatively high speed propulsion.

In one example of the invention, an electric motor that produces higher output power at lower voltage levels than previous designs by mechanically coupling multiple smaller individual motor units along a common shaft inside one large motor housing provides power to pumps and/or air compressors. In this example, additional individual motor units can be energized to provide an additional power stage. In a further example, such an electric motor is used to power pumps and/or air compressors in commercial air conditioning.

Figure 2:
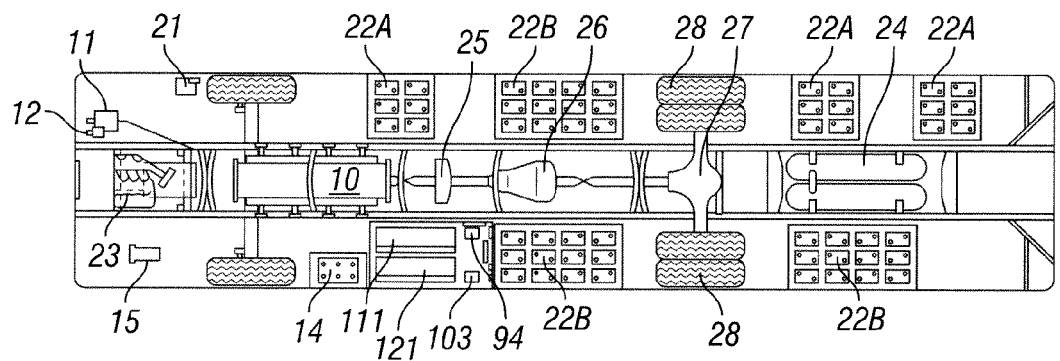
FIG. 2 is a plan view of an example vehicle

FIG. 2 shows a top view of an example hybrid electric vehicle that includes a primary electrical energy storage (in this example clusters of batteries connected in series) and a secondary energy storage (in this example tanks of propane fuel 24). In the illustrated example, the batteries are connected in series in clusters of six batteries per box 22a, or twelve batteries per box 22b, for a total of 54 batteries wired in series. In one mode, the multiple induction electric motor 10 is the only source of tractive power in the vehicle, and normally uses the first electrical power storage(for example, batteries) for power. During braking, the traction motor 10 can act as a generator, recharging the first electrical power storage. For extended range, the vehicle can be switched to battery-and-generator mode, and the propane generator 23 can be turned on to help power the motor and/or to recharge the batteries.

In this example, the multiple induction motor 10 has an output shaft lead to the torque converter 25, which itself has an output shaft leading to an automatic transmission 26. The automatic transmission's output shaft rotates the rear axle differential 27, which then rotates the driven wheels 28. This mode, therefore, a hybrid power source, single motive source vehicle is provided.

The two motor drive controllers 111 and 121 in this example each control an individual motor unit within the multiple induction electric motor 10. They are both powered by terminal 105 of the battery contactor 103, seen in FIG. 5B, and are given identical operating signals by the torque control and brake pedals 30, so they can act as a synchronous power source to the individual motor units 10A and 10B. This results in the units combining their output powers along their common shaft 4, making higher power at lower voltage and temperature levels possible.

Figure 5A:
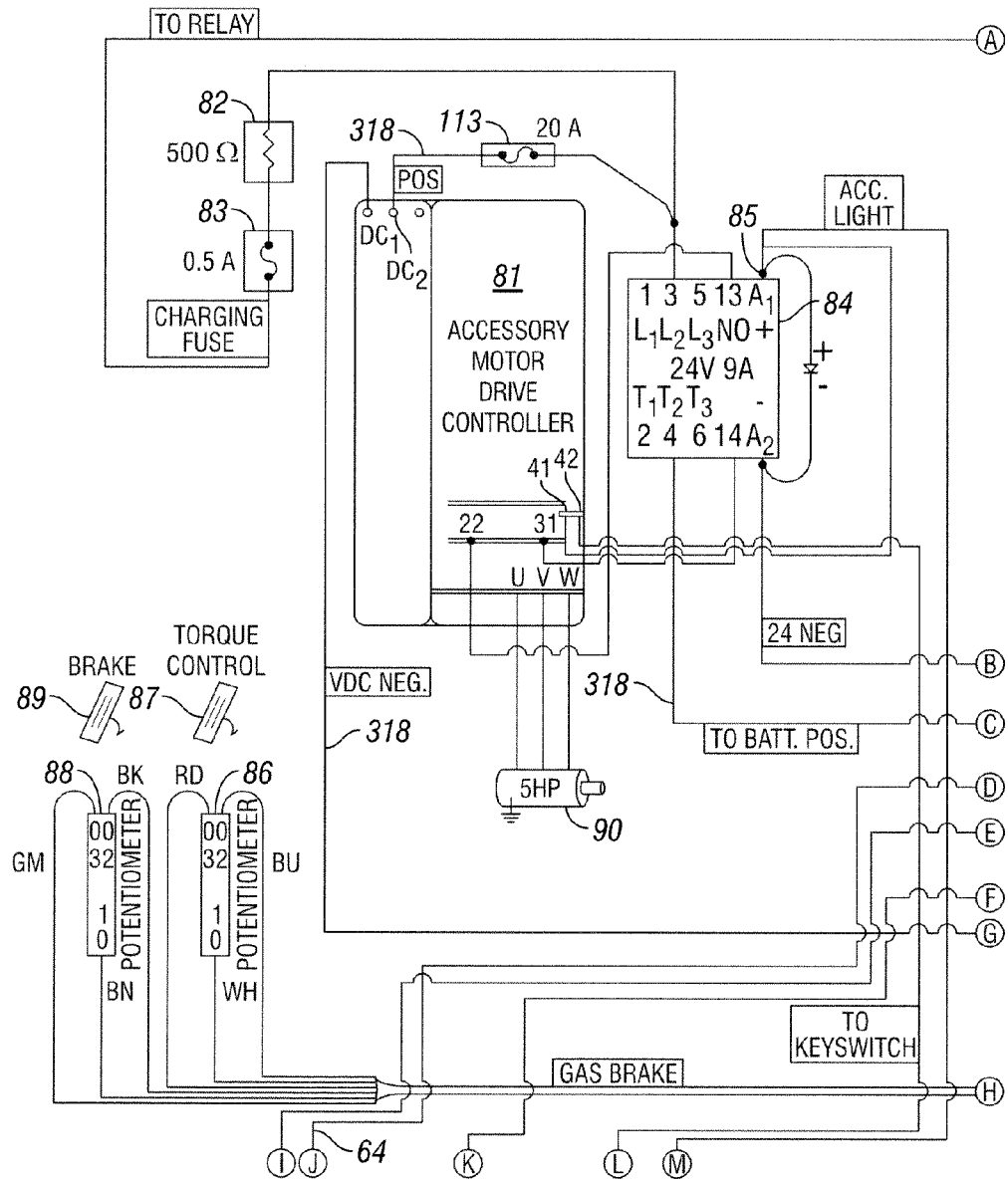
FIG. 5 is a circuit diagram of an example circuit diagram for a vehicle.
Figure 5B:
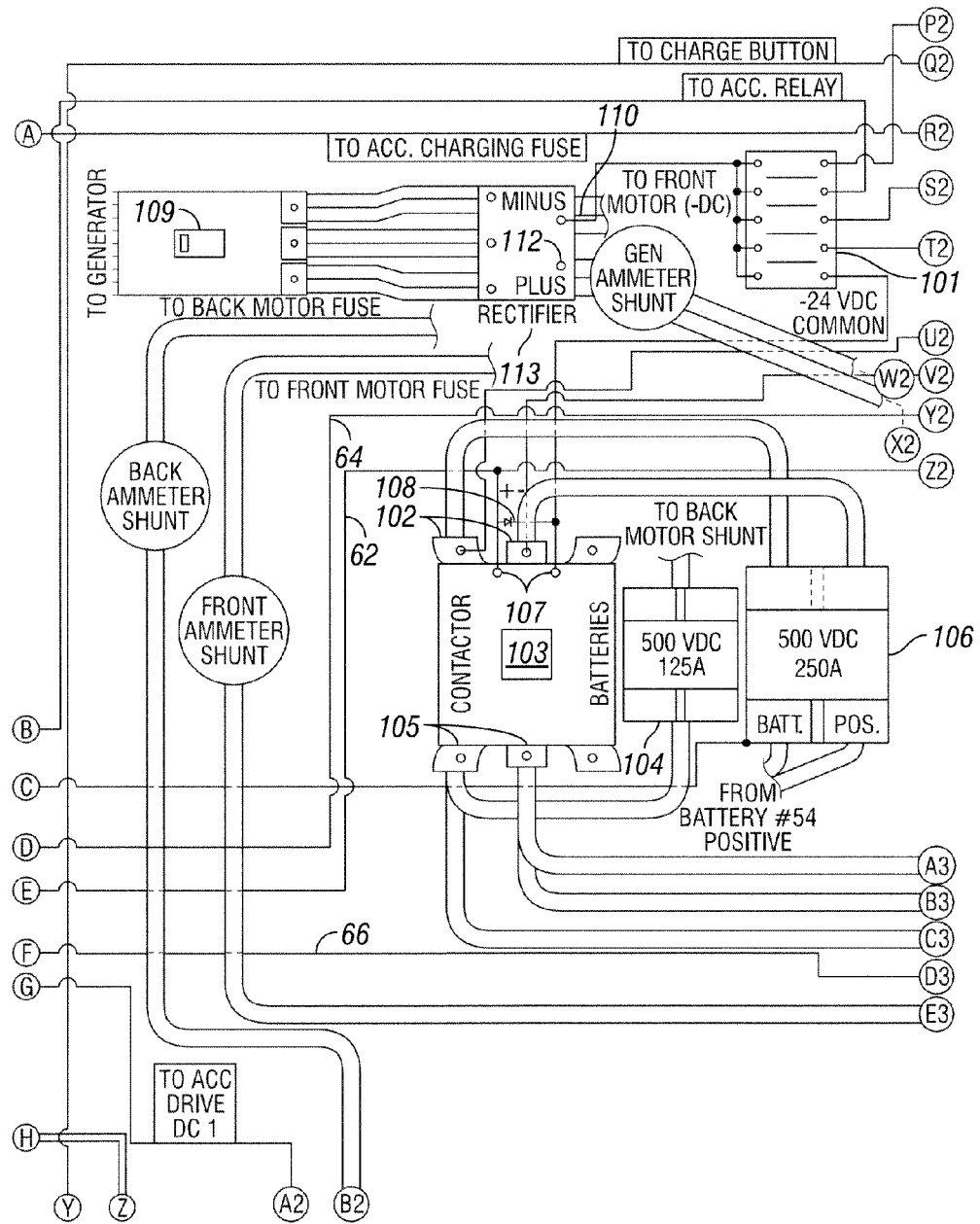
Figure 5C:
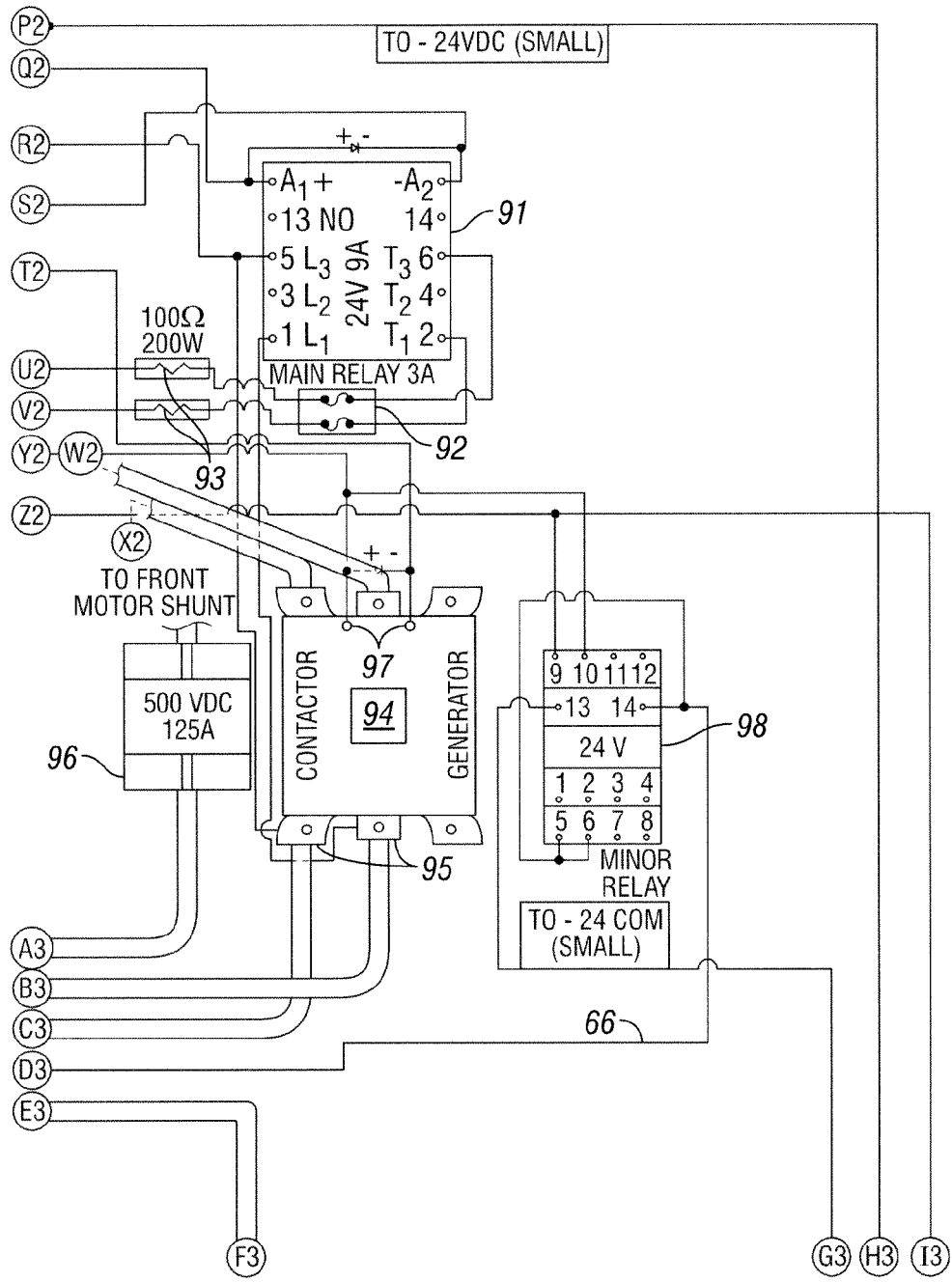
Figure 5D:
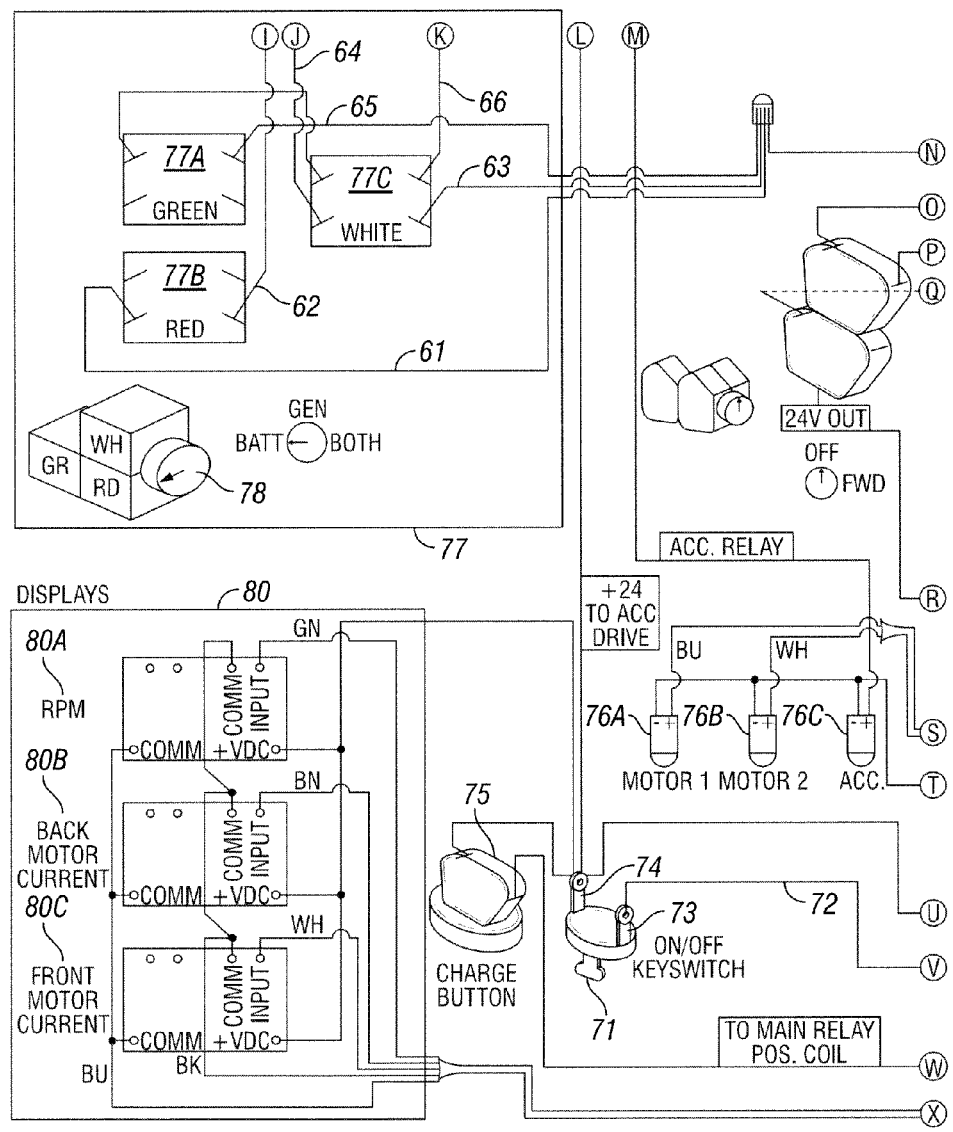
Figure 5E:
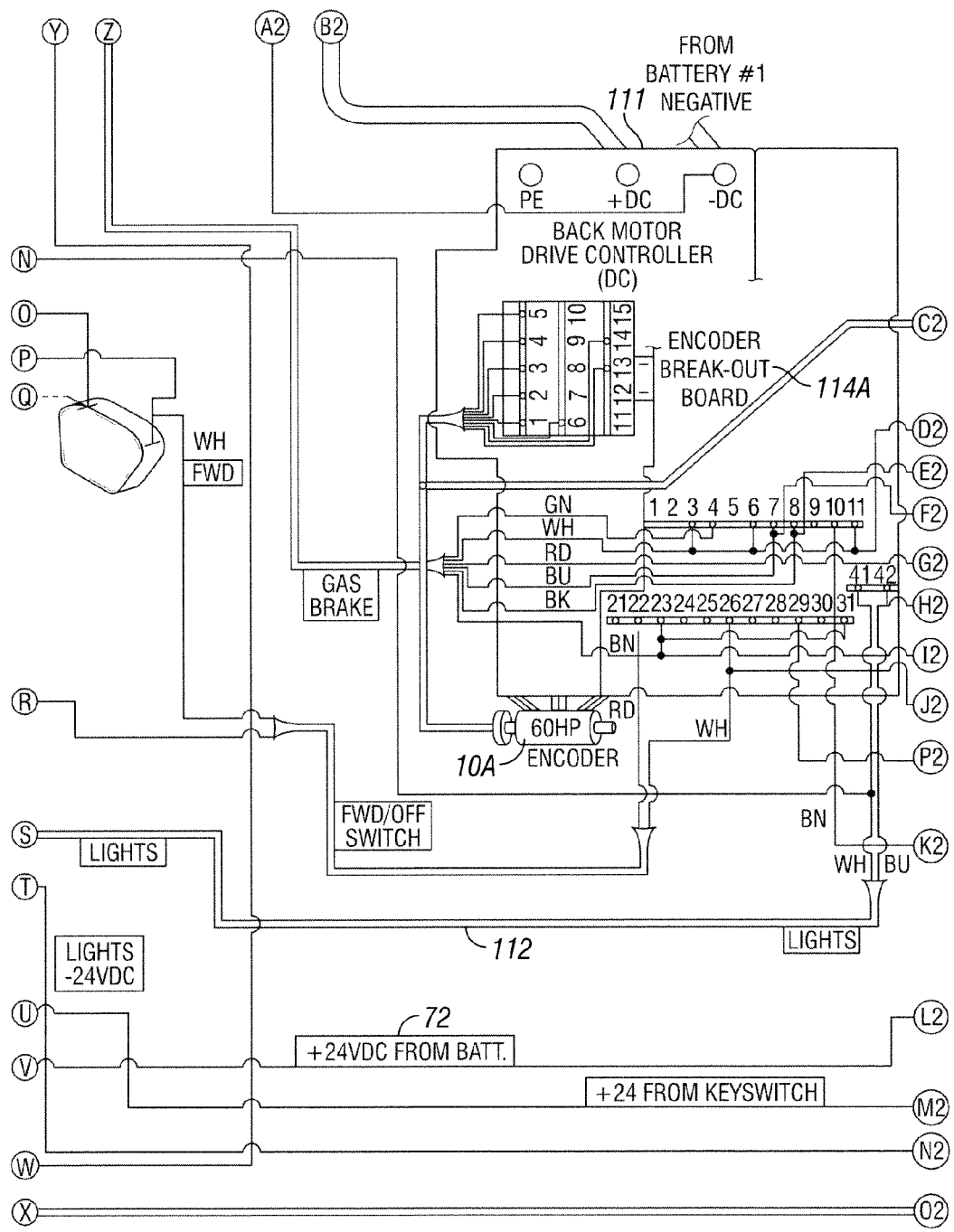

Referring still to the example of FIG. 2, the accessory electric motor 11 drives, via a coupling belt, an auxiliary alternator 12 and a power steering pump 13. The accessory motor's drive controller 21 has its power leads also coupled to the battery #54 (last in the series of 54 batteries) positive terminal, as shown in FIG. 5B, but has a separate fuse, relay box, and charging system from the traction motor drive controllers.

The auxiliary alternator 12 in this example provides the auxiliary energy storage 14, a battery, enough energy to run an air compressor 15, along with a cooling fan for the vehicle operator. The air compressor 15 enables the vehicle's conventional air braking system to be used by providing air pressure to release the friction brakes.

A separate contactor box exists for the batteries 103 and for the generator 94 in this example. The battery contactor 103 is always closed when the vehicle has been turned on and the motor drive controllers have been properly charged and powered up. The generator contactor 94 closes whenever the vehicle operator has engaged the battery-and-generator mode of operation, allowing both energy storage systems to power the multiple induction electric motor 10, and allowing the generator 23 to recharge the batteries.

Figure 3:
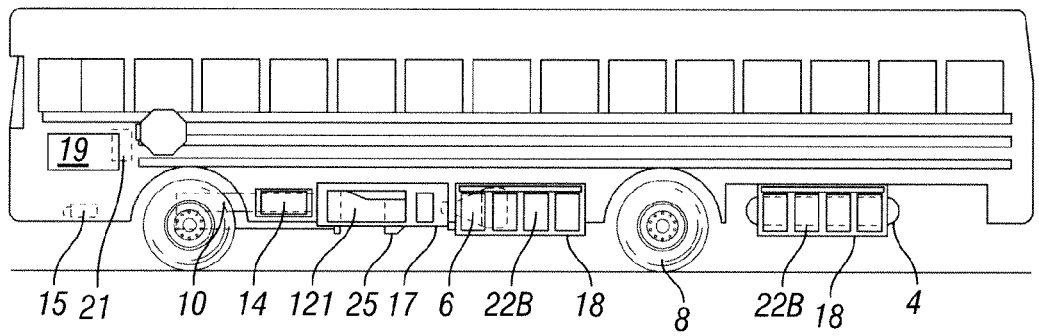
FIG. 3 is a side view of an example vehicle with some of the side panels not shown for clarity.

FIG. 3 shows a side view of an electric vehicle. Side panels are not shown to help display the shapes of the controls box 17 and of the battery boxes 18. Most of the existing circuitry to control the vehicle's lighting system can be found behind panel 19. In one example, the motor drive controllers 121 and 111 in control box 17 are Control Techniques Unidrive SP5402 motor drive controllers. These motor drive controllers are particularly well adapted to managing power for a heavy vehicle because they are designed to handle frequent motor starts and stops under heavy load without overheating. These motor controllers are normally used in elevators and this is their first known application in a moving vehicle.

Figure 4:
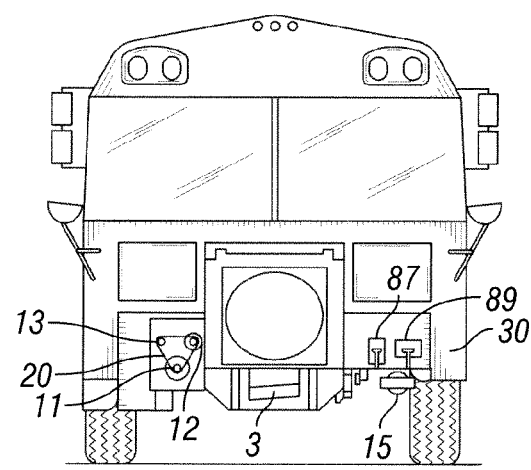
FIG. 4 is the frontal view of an example vehicle, with the bumper and some front panels removed.

FIG. 4 shows the front view of an electric vehicle, the panels and bumper are not shown to display components normally covered from view. The mechanically coupling belt 20 links the auxiliary alternator 12 and the power steering pump 13 to the accessory electric motor 11.

FIGS. 5A-5F provides a wiring diagram for an example electric vehicle. In this example, the keyswitch 71 is powered by the voltage seen at the fourth battery in a series of 54 batteries, a means for storing electrical energy. In this example, each battery provides 6 volts, and they are all wired in series, the voltages are summed, so that the 4th battery's positive terminal is 24 volts higher than the negative terminal of the 1st battery. The negative terminal of the first battery acts as the common reference point, and would be referred to as ground if this system was tied to the Earth. A single wire 72 leading from the positive terminal of the fourth battery applies a 24 volt potential to the first keyswitch terminal 73.

In this example, if the keyswitch is closed, the 24V applied to the first keyswitch terminal 73 is also applied to the second keyswitch terminal 74. The second keyswitch terminal 74 is connected to wires leading to pin 42 of the front motor drive controller 121, the accessory motor drive controller 81, the charge button 75, and the displays 80. The wires to the front motor drive controller 121 and accessory motor drive controller 81 are destined for pin 42 of the motor drive controllers, which use this 24 V signal to trigger display LEDs 76a and 76c when the drive is operational.

In this example, the charge button 75 receives +24V when the keyswitch 71 is on. By holding down the charge button 75, a switch is closed and that +24V is passed along a wire to the A1+ terminal of the main relay 91. The opposite −A2 terminal works in conjunction with A1+. The −A2 terminal is permanently at "0 volts" (the same voltage as the common reference point of the negative terminal of the first battery), since it is wired to the common board 101. The common board 101 has all of its left hand side ports wired to each other. The common board 101 can be used to "ground" a number of circuits because its left side ports are all wired to the negative terminal of the battery #1 in the series of 54 batteries, which acts as the ground.

In this example, when the charge button 75 is held down, terminal A1+ of the main relay 91 is at a potential 24 volts higher than terminal −A2 of the main relay 91, and the relay switches from opened connections to closed connections. This connects terminal T1 of the main relay 91 to terminal L1 of the main relay 91, T2 to L2, and T3 to L3. T1 and T3 are part of the motor drive controller charging circuits. The wires connected to terminals T1 and T3 of the main relay 91, pass through 3 amp fuses 92, so that the motor drive controllers 111 and 121 can charge up slowly, and through 100 ohm 200 Watt resistors 93, to ensure that at high voltages (54 batteries in series times 6 volts each for 324 volts) only a small amount of current passes (approximately 2 amps). These wires then end at the top terminals 102 of the batteries contactor 103. These terminals on the batteries contactor 103 are permanently hot, at 324 Volts DC, which can be seen by following the large cables connected to the top terminals of the batteries contactor 103 to one end of the 500 VDC 250 A fuse 106, the other end of which has more large cables leading to the positive terminal of battery #54 (last in the series of 54 batteries).

In this example, the T1 and T3 terminals of the main relay 91 are always at +324 Volts DC whenever there is no break in the series of batteries. Large cables coming from the positive terminal of battery #54 enter into the controls area, connecting to one side of a 250 A fuse 106. The other end of the fuse is connected to terminals 102 on the batteries contactor 103. Those same terminals 102 also have two small wires leading from them, passing through the 100 ohm charging resistors 93 and 3 amp fuses 92, and ending at the T1 and T3 terminals of the main relay 91. When the charging button 75 is depressed, closing the switches in the main relay 91, the other side of the main relay 91 (terminals L1 and L3) will be at +324V DC, and will carry a current of about 2 amps. Terminals L1 and L3 on the main relay 91 lead down wires to the terminals 95 on the bottom side of the generator contactor 94. Large cables from terminals 95 of the generator contactor 94 are connected to terminals 105 of the batteries contactor 103. Another pair of large cables lead from the terminals 105 on the bottom of the batteries contactor 103, to 500 VDC 125 A fuses 104 and 96 that are in-line with the back motor drive controller 111 and the front motor drive controller 121, respectively. The cables from the in-line fuses each lead into their respective motor drive controller's +DC terminal. In this way, the motor drive controllers 111 and 121 are supplied with a high voltage, low current power supply while the charging button 75 is held down. This low current power source allows the capacitors within the motor drive controllers to slowly and safely fill up with energy. Once they are fully charged, the motor drive controllers 111 and 121 are ready to operate, and only then can they receive the full power from the batteries without need of the protection of current limiting resistors 93. During normal operation, unnecessary resistance in the circuitry is undesirable because it hampers the flow of power from batteries to motor, reducing efficiency.

In this example, the motor drive controller's 111 and 121 receive a trickle of energy from the batteries while the charge button 75 is pressed down, which the operator holds down until the motor drive controllers 111 and 121 are charged. The display includes LEDs that illuminate when the motor drive controllers 111 and 121 are fully charged to inform the operator of that condition. The same charging action is also occurring for the 5 HP accessory motor drive controller 81. The L3 terminal of the main relay 91 has a second wire traveling to the accessory motor drive controller 81. The power provided at the L3 terminal of the main relay 91 is reduced even further along this path, by a 500 ohm resistor 82, such that the 0.5 Amp fuse 83 on this path won't be tripped. The accessory motor drive controller 81 is a smaller device, and needs less power to charge up and come online. This wire comes to junction at the L2 terminal of the 24V 9 A accessory relay 84, and so can connect to the DC2 terminal of the accessory motor drive controller 81.

In this example, the LED lights 76 indicating the motor drive controllers 81, 111, and 121 are charged are illuminated by the following circuitry. When the motor drive controllers 81, 111, and 121 are fully charged, a connection between pins 42 and 41 in each motor drive controller closes, passing a "powered on" signal. A wire from pin 41 of motor drive controller 81 leads to a 4-wire junction 85 connected to the 24V 9 A relay 84 outside of the relay's A1 terminal. Another wire at this junction, allows this 24V to pass down to the positive terminal of an LED 76c Since there is now a sufficient voltage difference between the positive and negative terminals of LED 76c, it lights up. Note the negative LED terminals are wired to the common 0 voltage path via a wire leading into a minor common port board 122, which has a wire in its top left port leading up to the main 0 voltage common port board 101.

In this example, LEDs 76a and 76b illuminate to indicate that the traction motor drive controllers 111 and 121 are on. Front motor controller 121 has its pin 42 connected to the 24V at the keyswitch 71. Pin 41 can now pass this signal on to pin 42 of back motor controller 111, and on to its own LED 76b via the bundled wire cable 112. Pin 41 of the back motor controller 111 is also now at 24V, so it too can light up its LED 76a.

In this example, with the motor driver controllers 111 and 121 fully charged, power is passed from the energy sources unrestrained. The Batt/Gen/Both switching circuit 77 helps accomplish this. The Batt/Gen/Both switches 77a, 77b, and 77c receive 24V from pin 41 of back motor controller 111. Wires 65, 63, and 61 are all at 24V when pin 41 of back motor drive controller 111 is at 24V. Wires 62 and 64 lead out of the switching blocks 77c and 77b and into terminals 107 and 97 that decide whether or not the contactor boxes 103 and 94 should be open or closed. These smaller terminals 107 and 97 have one end (with either wire 62 or 64) that can be at 0V or 24V, depending on the switch position, and the other end permanently at 0V, since it is wired to the 0V common reference signal provided at the −24 VDC common port board 101. A small diode 108 bridging these wires is a protective measure, since it has been found that, when the solenoids within these contactors open and close, a sharp spike in voltage can occur, which may damage components. The diode 108 does not interfere with the signals used for controlling the contactors 103 and 94.

In this example, when wire 62 is hot (i.e. passing along a 24V DC signal), the contactors within the batteries contactor 103 closes, and now the full voltage and current passed in from the batteries to the top terminals 102 of the contact box will travel through to the bottom terminals 105. From there, the power passes via large cables leading through the in-line fuses 104 and 96 and into the +DC terminals of the motor drive controllers 111 and 121. These cables have very low resistance, and open a path that contains no resistors, so the full power provided by the batteries can enter the motor drive controllers 111 and 121 unimpeded. Likewise, when wire 64 is hot, the contacts in generator contactor 94 close, and the power provided by the generator can pass into the motor drive controllers 111 and 121. Finally, when both wires 62 and 64 are hot, both the batteries and the generator provide power to the motor drive controllers.

In this example, the generator 23 provides a 230 volt 3-phase AC alternating current. The motor drive controllers 111 and 121, however, are designed to receive approximately 320 volts DC direct current at their +DC terminal. To accomplish this, an AC to DC rectifier 113 is used. The three phase lines from the generator 23 lead into the switchbox 109. A pair of cables connects each terminal on the switchbox 109 to a terminal on the rectifier 113. The rectifier 113 will convert the 230 volts AC into 320 volts DC, which is passed out using the negative terminal 110 and the positive terminal 112. The negative terminal 110 is tied to the 1st battery's negative terminal by having both terminals' cables attach to the same point, the –DC terminal on the front motor drive controller 121. And since both the front motor drive controller's and back motor drive controller's –DC terminals have cables connecting to the 1st battery's negative terminal, all three terminals are tied together to be the same common zero voltage reference. A wire goes from the negative terminal 110 of the rectifier 113 to the –24 VDC common port board 101, showing the 0 voltage common reference circuit. The common and negative circuits are all in constant contact with each other, regardless of whether or not the contactors 103 and 94 are closed, since the contactors only affect whether the high voltage circuits are connected.

In this example, the motors always turn in the same direction. If the vehicle needs to go in reverse, the automatic transmission's gear selection stick is used to shift the transmission into reverse gear.

In this example, a potentiometer 86 determines how far down the torque control pedal 87 has been pressed, and a proportional amount of torque is demanded from the motors 10. The potentiometer 86 has one terminal connected to pin 4 of the motor drive controllers 111 and 121 to receive a high voltage signal, another terminal connected to pin 3 of the motor drive controllers 111 and 121 to receive a low voltage signal, and a final terminal that outputs a signal between the previous two signals, in direct proportion to how far down the pedal is pressed. When fully depressed, the third terminal outputs to pin 7 of the motor drive controllers 111 and 121 a signal as powerful as the high voltage terminal; when the pedal is released, the third terminal's signal drops to that of the low voltage signal.

In this example, the torque control pedal 87 acts as a torque demand control. When pressed down, the operator is demanding more torque, which results in an increase in speed when driving on flat ground, or allows climbing of steeper angles, or increases the amount of load that can be pulled, in exactly the same manner as an torque control pedal in a conventional vehicle.

In this example, the brake pedal 89 works in a similar manner. Another potentiometer 88 measures how far down the brake pedal has been depressed, and relays this signal to pin 8 of the motor drive controllers 111 and 121. This signal, however, is interpreted as a negative torque offset. If the torque control pedal is not depressed (thus demanding 0 torque from the motor), and the brake is depressed (thus demanding negative torque), the total torque demand is negative. The motor drive controllers 111 and 121 are capable of slowing the motor down when total torque demand is negative through a process called regenerative braking. In regenerative braking, the motor is operated like a generator. Instead of consuming power to speed up, it produces power and slows down. This power travels from the motor 10, through the motor drive controllers 111 and 121, which convert the power from AC to DC, and into the high voltage circuitry. The batteries 22 absorb this power, and can thus recharge every time the vehicle brakes.

In one example, a logic algorithm is implemented using the motor drive controller's logic resources. In this logic algorithm, the brake offset would be ignored at all times except for when the drive signal was forward and the motor speed was a positive amount. This means the brake signal will be ignored unless the vehicle is moving forward.

In this example the vehicle retains a conventional air braking system in which the air activated friction brakes activate only after the brake pedal 89 was depressed more than half way. In this example, the first half of the brake pedal 89 travel using a potentiometer 88, and the output signal is used to control regenerative braking. If the brake pedal 89 is further depressed, the air braking system activates, and the braking transitions from mostly electrical to mostly mechanical in nature.

In this example, every pin 31 of the motor drive controllers 111, 121, and 81 receives a signal from pin 22. That is because pin 31 needs to receive a high voltage signal in order for the motor drive controllers to be in a running state, instead of in an inhibited state. Since pin 22 provides power, it has been wired directly into pin 31. The accessory motor drive controller 81 waits until its governing relay 84 has closed circuit contacts before its pin 21 powers pin 31. Because relay 84 remains closed as long as the accessory motor drive controller 81 is on, pin 31 remains powered while the controller is powered.

In this example, the minor relay 98 supports the functionality of the Batt/Gen/Both dial 78. The displays 80*a*, 80*b*, and 80*c* are powered (at the +VDC terminal) by the keyswitch 71 and grounded (Comm) by motor drive controllers 111 and 121 0V pins, and each display receives one appropriate input signal. Pin 10 of the motor drive controllers 111 and 121 is programmed to send out an analogue signal whose voltage strength is proportional to the current traveling from the motor drive controller 111 or 121 to its respective motor unit 10A or 10B, and pin 9 is programmed to send a signal proportional to rate of rotation of the motor unit 10A or 10B. Scaling is done at the display so that these small range voltage differences resulted in an accurate range of digital representations so the highest signal possible can represent the highest current output possible for the current displays, and the highest rotational speed possible for the RPM display.

In this example, pin 9 of the Minor Relay 98 is connected to pin 29 of the motor drive controllers 111 and 121. This allows regenerative braking to be disabled when the vehicle is operated in the generator only mode. Without this connection, the battery contactor 103 is usually opened when the bus operator has selected generator only mode, which disconnects the batteries 22 from the rest of the system. If the batteries 22 are disconnected, there is nowhere for the energy from regenerative braking to flow, so regenerative braking could result in damage to the vehicle electrical systems.

In this example, the accessory motor drive controller 81 receives its main operational power via a wire leading from the Batt. Pos. terminal of the 500 VDC 250 A fuse 106 to the T1 terminal of the accessory motor drive controller's relay 84. With the relay 84 closed during operation, the L1 terminal outputs the power received from the batteries 22 into the DC2 terminal of the accessory motor drive controller 81. The accessory motor drive controller 81 doesn't require much power to run the 5 HP motor 90 so a 20 amp fuse 113 is included in the power line.

In this example, a motor encoder is mounted to the shaft to provide direct measurement of rotor position and rotational speed. Encoder break-out boards 114*a* and 114*b* are attached to the motor drive controllers 111 and 121 to operate a motor position encoder. Various pins on the encoder breakout board 114 are used to provide the motor position encoder with power and ground signals, and to receive data from the encoder over six channels to decipher how quickly the motor unit 10A or 10B is spinning to a precision of hundredths of a rotation. The output from the motor position encoder is input to the motor driver controllers 111 and 121. This enables the motor drive controllers 111 and 121 to give very precise voltage and current input commands to the motor to have it behave as desired. Use of the motor position encoder increases the vehicle's performance and decreases motor vibrations immensely. Without rotor position input from an encoder, the motor drive controllers must estimate the speed of the rotor when determining the proper waveform to provide the motor unit. Errors in the estimation of rotor speed can cause the motor to send incorrect waveforms to the motor unit, causing vibration and other undesired operation.

In further examples, the 250 amp fuse 106 is replaced with a 300 amp UL class J slow acting fuse, for long term overcurrent protection and the 125 amp fuses 104 and 96 are replaced with 350 amp Ferraz high speed class J fuses to protect against sudden current surges.

In further examples, thermocouples are attached to the battery terminals to allow monitoring of battery temperatures.

In a further example, a prototype school bus equipped with systems as described above is able to operate at a full load of 29,000 pounds at speeds over 50 mph using battery power and a propane powered generator. Tests of this prototype achieved driving ranges of 40 miles on battery power alone and 200 miles when using both the batteries and generator with a 60 gallon propane tank. Further testing showed that, when both the batteries and generator were active, the generator provided approximately half of the energy used by the multiple induction motor during the first 20 miles and approximately two-thirds of the energy used by the motor during the second 20 miles, with contribution of the batteries continuing to decrease gradually and stopping completely at approximately 80 miles into the test. Unexpectedly, even though the batteries had stopped contributing power to the multiple induction motor, they still contained enough energy to power the prototype for at least ten miles at full speed in a battery only mode.

In a further example, a prototype school bus equipped with systems as described above operated as follows in 600 miles of road testing. The prototype has not had a system shut down, battery meltdown, or circuit incident. Several trends have been observed in the prototype's average driving cycle. The more the batteries are charged, the further the bus will go without depending heavily on the generator when running in the hybrid battery+generator mode. Trips that start out with a low battery voltage, of say 330V, will reach the point where the generator provides 3 times as much power as the batteries to run the motor by the 25th mile. By the 60th mile, the generator is essentially running the motor without help from the batteries. Trips that start out with a high battery voltage, around 340V, will reach the 3 to 1 generator to battery ratio at mile 60 and will go 120 miles before the generator runs the motor without any input from the batteries.

In this prototype, the batteries need about 24 hours of charging time to achieve the high voltage capacity discussed above. This recharge time could be significantly reduced by switching from lead-acid battery technology to lithium-ion. Charging times may be cut in half or more, due to lithium's excellent charge/discharge capabilities. Improvements over the current three battery charger charging system may also improve charging performance.

The prototype transmission is a 4 speed model, with the highest gear being a direct drive. The transmission is preceded by a torque converter with a 2:1 torque output to input ratio. The prototype is capable of cruising in third gear at 2600 rpm in most any situation. This moves the vehicle between 45 and 50 mph. If the wind isn't blowing against the direction of travel, the transmission can shift into fourth gear and maintain about 2300 rpm, which puts vehicle ground speed between 55 and 60 mph. If the wind is against the direction of travel, the transmission is maintained in third gear. Power consumption during these cruising stretches is about 70 kiloWatts (kW). During acceleration, the power output peaks at about 90 kW. If the batteries are well charged, they provide a significant amount of this power usage during the initial 40 to 60 miles of the drive. By the time the vehicle reaches the 3 to 1 generator to battery ratio, if cruising such that 70 kW is being used by the motor, then the generator is producing about 52 kW of that power, while the batteries are supplying the remaining 18 kW. Since the generator helps regulate the voltage at a near constant 320 Volts (V), 70 kW at 320 V means the current is about 218 Amps (A). That 218 A is divided between the two motor drives, with the current meters to each motor drive controller hovering around the 110 A mark. If the generator is at the 3 to 1 ratio of power provided compared to the batteries, of the approximately 220 A, 165 A is provided by the generator, and 55 A is provided by the battery.

As the prototype vehicle travels, the batteries become less able to provide power, and the generator moves toward a position of sole provision of power to run the vehicle. While the generator's power rating is 60 kW, it is capable of providing about 70 kW of power continuously, which allows the vehicle to cruise at about 45 to 50 mph on the generator alone. However, if more than 70 kW is demanded from the generator, an overload current breaker will trip. The breaker has an automatic reset after about 20 seconds, allowing the generator to see if the load has been reduced enough that it can operate without being overloaded. During this time, the batteries become the sole provider of electricity, and surprisingly enough, they retain enough charge even this far into the vehicle's travel to keep the bus moving at 45 to 50 mph; no reduction in vehicle speed is noticed.

In the prototype vehicle, a problem arises if the generator's current breaker trips two or three times. Those stretches where the batteries alone power the vehicle will deplete the batteries to a point where they finally begin accepting power from the generator to recharge. This occurs because the battery-alone voltage falls below the 320 V mark the generator will provide, and so now the depleted batteries are at a lower voltage than the generator, and will accept some of its power to recharge. However, the generator is already at its limit providing 70 kW to run the motor; the 3 to 5 kW the batteries ask from the generator to recharge on top of that will only cause the generator to overload trip more frequently, which in turn requires the batteries to drain even more of their remaining power during the generator's overload trip. A point is reached where the vehicle will need to slow down somewhat so that generator power can be spent bringing the batteries back up to 320 V instead of being spent entirely on the motor to keep top speed.

In the prototype vehicle, it is easy to avoid overworking the generator. A cue to its impending overload trip is a reduction in power provided, which is accompanied by a reduction in noise. When this happens, the driver lets off the accelerator momentarily, the system will settle at a new velocity slightly lower than before, where the load is reduced and the generator isn't asked to do so much that it will overload trip.

In the prototype vehicle, the generator does indeed recharge the batteries. The generator has been seen to provide 20 kW of power to the system while the motor is at rest, which means all of those 20 kW are going to recharge the batteries.

The prototype vehicle has a range of about 25 to 35 miles at 50 mph from the batteries alone while fully loaded, and can travel from 170 to 200 miles at 50 mph in battery+generator hybrid mode. In further examples, a lithium battery pack is used, providing the same voltage as a lead-acid pack, contains twice the amount of energy as the lead batteries while only weighing half as much. When using lithium batteries, the battery-only range is expected to increase to 50 or 60 miles fully loaded.

In one example, the propane tanks hold about 40 gallons of liquid propane gas (LPG). A quick estimate shows the vehicle exceeds 4.5 miles per gallon off of LPG when running in hybrid mode. This compares well to the diesel engines in typical in similar vehicles, which make about 5 mpg, especially when you consider the current prices of each fuel. LPG is currently available for about $1.50 a gallon, while diesel costs about $2.50 a gallon. Average recharge rates are 80 kilowatt hours, or about 0.67 kilowatt hours per mile, with a local delivery rate of $0.10 per kilowatt hour. This gives a total cost per mile for a long trip of $0.40 per mile using battery and generator power, which compared well with $0.50 per mile for a similar diesel powered vehicle. It is expected that the addition of a fuel injection system to the generator would improve efficiency and allow the efficiency of the vehicle to increase to 9 mpg in the generator only mode.

In one example, the vehicle further includes a battery management system. In this example, the battery management system 1) balances the system charging, ensuring every battery cell is recharged an appropriate amount, which will lengthen cell life (the number of recharge "hits" it can take before dying), 2) balances the system discharging, so no one battery cell over-discharges during operation (which would reduce cell lifetime), 3) stores records of past charge and discharge cycles, to aid in battery-pack diagnostics and performance monitoring, and 4) signals when the battery pack has been discharged during a driving route.

In further examples, the battery management system monitors the temperature, voltage level, and operational status of every in the battery pack. In some examples the battery management system communicates with other vehicle components via Ethernet, CANbus, or other standard electrical communication links.

In one example of the invention, the vehicle batteries are recharged by a recharging station. In this example, the recharging station 1) communicates with the battery management system, 2) communicates to other computers over the internet, 3) has a two-phase charging cycle, first charging at a constant current level, and then charging at a constant voltage level, for quick and efficient recharging, 4) can receive payment for electricity used in recharging via credit card, 5) fully recharges the batteries in two and a half hours. In this example, with the BMS signaling an appropriate discharge level and the charging station only recharging an appropriate amount, the batteries can be kept in a "sweet-spot" of never overcharging or undercharging, which will prolong battery life.

In a further example of the invention, the batteries comprise a pack of 108 lithium ion cells. In this example, the driving range is 45 miles using battery power alone and 225 miles using batteries and generator, we have a driving range of 225 miles, with a top speed of 60 mph. In this example, the batteries can be recharged in two and a half hours. This battery pack can route power around any faulty cells, so that the loss of one cell does not cause a failure of the entire series chain of batteries. The cost per mile for battery-alone operation has been reduced to $0.19 a mile when recharging the batteries in the afternoon (with a rate of $0.10 per kWh), or $0.04 a mile when recharging at night (with a rate of $0.02 per kWh).

The foregoing disclosure is presented for purposes of illustration and description, and is not intended to limit the invention to the forms disclosed herein. Consequently, variations and modifications commensurate with the above disclosures and the disclosure of the relevant art are within the spirit of the invention. Such variations will readily suggest themselves to those skilled in the relevant art. Further, the examples described are also intended to explain the best mode for carrying out the invention, and to enable others skilled in the art to utilize the invention and such or other embodiments and with various modifications required by the particular applications or uses of the invention. It is intended that the appended claims be construed to include alternative embodiments to the extent that is permitted by prior art.

What is claimed is:

1. A method for turning a shaft comprising:
   receiving a first direct current power input;
   receiving a second direct current power input;
   producing a first variable frequency alternating current control signal from the first direct current power input;
   separately producing a second variable frequency alternating current control signal from the second direct current power input, synchronized to the first variable frequency alternating current control signal;
   producing a first rotating magnetic field responsive to the first variable frequency alternating current control signal;
   producing a second rotating magnetic field, responsive to the second variable frequency alternating current control signal and synchronized to the first rotating magnetic field;
   inducing a first induced magnetic field around a conductor in a first inductive rotor, responsive to the first rotating magnetic field;
   inducing a second induced magnetic field around a conductor in a second inductive rotor, responsive to the second rotating magnetic field;
   applying a first rotational force between the first rotating magnetic field and the first induced magnetic field to the shaft; and
   applying a second rotational force between the second rotating magnetic field and the second induced magnetic field to the shaft.

2. A system for turning a shaft comprising:
   means for receiving a first direct current power input;
   means for receiving a second direct current power input;
   means for producing a first variable frequency alternating current control signal from the first direct current power input;
   means for separately producing a second variable frequency alternating current control signal from the second direct current power input, synchronized to the first variable frequency alternating current control signal means for producing a first rotating magnetic field responsive to the first variable frequency alternating current control signal;

means for producing a second rotating magnetic field, responsive to the second variable frequency alternating current control signal and synchronized to the first rotating magnetic field;

means for inducing a first induced magnetic field around a conductor in a first inductive rotor, responsive to the first rotating magnetic field;

means for inducing a second induced magnetic field around a conductor in a second inductive rotor, responsive to the second rotating magnetic field;

means for applying a first rotational force between the first rotating magnetic field and the first induced magnetic field to the shaft; and means for applying a second rotational force between the second rotating magnetic field and the second induced magnetic field to the shaft.

3. The system of turning a shaft of claim 2 wherein:

the means for receiving a first direct current power input and the means for producing a first variable frequency alternating current control signal comprise a first variable frequency motor drive controller; and the means for receiving a second direct current power input and the means for separately producing a second variable frequency alternating current control signal comprise a second variable frequency motor drive controller.

4. The system for turning a shaft of claim 3 wherein:

the means for producing a first rotating magnetic field comprises a first stator;

the means for producing a second rotating magnetic field comprises a second stator;

the means for inducing the first induced magnetic field comprises the first inductive rotor; and the means for inducing the second induced magnetic field comprises the second inductive rotor.

5. The system of claim 4 wherein the first and second inductive rotors each comprises a squirrel cage rotor.

6. The system for turning a shaft of claim 4 wherein:

the first stator further comprises a plurality of stator laminates stacked together;

the second stator further comprises a plurality of stator laminates stacked together;

the first inductive rotor further comprises a plurality of rotor laminates stacked together;

the second inductive rotor further comprises a plurality of rotor laminates stacked together; and the first stator, second stator, first inductive rotor, and second inductive rotor each has a stacking factor of at least 98 percent.

7. The system for turning a shaft of claim 6 wherein:

the plurality of stator laminates of the first stator are rotated approximately 180 degrees relative to adjacent stator laminates;

the plurality of stator laminates of the second stator are rotated approximately 180 degrees relative to adjacent stator laminates;

the plurality of rotor laminates of the first inductive rotor are rotated approximately 180 degrees relative to adjacent rotor laminates; and the plurality of rotor laminates of the second inductive rotor are rotated approximately 180 degrees relative to adjacent rotor laminates.

8. The system for turning a shaft of claim 7 wherein the first and second stator each further comprises form wound wire windings.

9. The system for turning a shaft of claim 2 wherein:

the means for applying a first rotational force between the first rotating magnetic field and the first induced magnetic field to the shaft comprises the first inductive rotor rigidly joined to the shaft; and the means applying a second rotational force between the second rotating magnetic field and the second induced magnetic field to the shaft comprises the second inductive rotor rigidly joined to the shaft.

10. A system for turning a shaft comprising:

a first variable frequency motor drive controller;

a second variable frequency motor drive controller synchronized to the first variable frequency motor drive controller;

a first stator positioned and arranged to receive a first variable frequency alternating current control signal from the first variable frequency motor drive controller;

a second stator positioned and arranged to receive a second variable frequency alternating current control signal from the second variable frequency motor drive controller;

a first inductive rotor responsive to the first stator and rigidly joined to the shaft; and a second inductive rotor responsive to the second stator and rigidly joined to the shaft.

11. The system for turning a shaft of claim 10 wherein:

the first stator comprises a plurality of stator laminates stacked together;

the second stator further comprises a plurality of stator laminates stacked together; and the first and second stator each have a stacking factor of at least about 98 percent.

12. The system for turning a shaft of claim 11 wherein the plurality of stator laminates are rotated approximately 180 degrees relative to adjacent stator laminates.

13. The system for turning a shaft of claim 10 wherein the first and second stator each further comprises form wound wire windings.

14. The system for turning a shaft of claim 10 wherein the first and second inductive rotor each comprises a squirrel cage rotor.

15. The system for turning a shaft of claim 14 wherein:

the first inductive rotor and second inductive rotor each further comprises a plurality of rotor laminates stacked together; and the first inductive rotor and second inductive rotor each have a stacking factor of at least about 98 percent.

16. The system for turning a shaft of claim 15 wherein:

the plurality of rotor laminates of the first inductive rotor are rotated approximately 180 degrees relative to adjacent rotor laminates; and the plurality of rotor laminates of the second inductive rotor are rotated approximately 180 degrees relative to adjacent rotor laminates.

17. A method of propelling a vehicle comprising:

storing electrical power;

providing a first direct current power input from the stored electrical power;

providing a second direct current power input from the stored electrical power;

producing a first variable frequency alternating current control signal from the first direct current power input;

separately producing a second variable frequency alternating current control signal from the second direct current power input, synchronized to the first variable frequency alternating current control signal;

producing a first rotating magnetic field responsive to the first variable frequency alternating current control signal;

producing a second rotating magnetic field, responsive to the second variable frequency alternating current control signal, synchronized to the first rotating magnetic field;

inducing a first induced magnetic field around a conductor in a first inductive rotor responsive to the first rotating magnetic field;

inducing a second induced magnetic field around a conductor in a second inductive rotor responsive to the second rotating magnetic field;

applying a first rotational force between the first rotating magnetic field and the first induced magnetic field to the shaft;

applying a second rotational force between the second rotating magnetic field and the second induced magnetic field to the shaft; and transmitting the first and second rotational forces to a drive wheel.

18. The method of propelling a vehicle of claim 17, further comprising:

generating electrical power;

augmenting the first direct current power input with the generated electrical power; and augmenting the second direct current power input with the generated electrical power.

19. The method of propelling a vehicle of claim 18, further comprising:

recharging the stored electrical power from the generated electrical power.

20. A vehicle comprising:

means for supporting a load;

at least one means for propelling the means for carrying a load by applying rotational motion to the ground and carrying at least a portion of the means for supporting a load;

means, mounted on the means for supporting a load, for storing electrical power;

means, mounted on the means for supporting a load, for providing a first direct current power input from the stored electrical power;

means, mounted on the means for supporting a load, for providing a second direct current power input from the stored electrical power;

means, mounted on the means for supporting a load, for producing a first variable frequency alternating current control signal from the first direct current power input;

means, mounted on the means for supporting a load, for separately producing a second variable frequency alternating current control signal from the second direct current power input, synchronized to the first variable frequency alternating current control signal;

means, mounted on the means for supporting a load, for producing a first rotating magnetic field responsive to the first variable frequency alternating current control signal;

means, mounted on the means for supporting a load, for producing a second rotating magnetic field, responsive to the second variable frequency alternating current control signal, synchronized to the first rotating magnetic field;

means, mounted on the means for supporting a load, for inducing a first induced magnetic field around a conductor in a first inductive rotor responsive to the first rotating magnetic field;

means, mounted on the means for supporting a load, for inducing a second induced magnetic field around a conductor in a second inductive rotor responsive to the second rotating magnetic field;

means, mounted on the means for supporting a load, for applying a first rotational force between the first rotating magnetic field and the first induced magnetic field to the shaft;

means, mounted on the means for supporting a load, for applying a second rotational force between the second rotating magnetic field and the second induced magnetic field to the shaft; and means for converting the first and second rotational forces to the at least one means for propelling the means for carrying a load by applying rotational motion to the ground.

21. The vehicle of claim 20, wherein:

the means for producing a first variable frequency alternating current control signal comprises a first variable frequency motor drive controller; and the means for separately producing a second variable frequency alternating current control signal comprises a second variable frequency motor drive controller.

22. The vehicle of claim 21, wherein:

the means for providing a first direct current power input from the stored electrical power comprise a first lead connecting the means for storing electrical energy to the first variable frequency motor drive controller;

the means for providing a second direct current power input from the stored electrical power comprise a second lead connecting the means for storing electrical energy to the second variable frequency motor drive controller.

23. The vehicle of claim 22, wherein:

the means for producing a first rotating magnetic field comprises a first stator;

the means for producing a second rotating magnetic field comprises a second stator;

the means for inducing the first induced magnetic field comprises the first inductive rotor; and the means for inducing the second induced magnetic field comprises the second inductive rotor.

24. The system for turning a shaft of claim 23 wherein:

the means for applying a first rotational force between the first rotating magnetic field and the first induced magnetic field to the shaft comprises the first inductive rotor rigidly joined to the shaft; and the means applying a second rotational force between the second rotating magnetic field and the second induced magnetic field to the shaft comprises the second inductive rotor rigidly joined to the shaft.

25. The vehicle of claim 24, wherein:

the first stator further comprises a plurality of stator laminates stacked together;

the second stator further comprises a plurality of stator laminates stacked together;

the first inductive rotor further comprises a plurality of rotor laminates stacked together;

the second inductive rotor further comprises a plurality of rotor laminates stacked together; and the first and second stators and the first and second inductive rotors each has a stacking factor of at least 98 percent.

26. The vehicle of claim 25, wherein:
the plurality of stator laminates of the first stator are rotated approximately 180 degrees relative to adjacent stator laminates;
the plurality of stator laminates of the second stator are rotated approximately 180 degrees relative to adjacent stator laminates
the plurality of rotor laminates of the first inductive rotor are rotated approximately 180 degrees relative to adjacent rotor laminates; and
the plurality of rotor laminates of the second inductive rotor are rotated approximately 180 degrees relative to adjacent rotor laminates.

27. The vehicle of claim 26 wherein the first and second inductive rotors each comprises a squirrel cage rotor.

28. The vehicle of claim 24, further comprising:
means, mounted on the means for supporting a load, for generating electrical power;
means for augmenting the first direct current power input with the generated electrical power;
means for augmenting the second direct current power input with the generated electrical power.

29. The vehicle of claim 28, wherein:
the means for generating electrical power comprises a generator.

30. The vehicle of claim 29, wherein:
the means for augmenting the first direct current power input with the generated electrical power comprises a third power lead connecting the generator to the first variable frequency motor drive controller; and
the means for augmenting the second direct current power input with the generated electrical power comprises a fourth power lead connecting the generator to the second variable frequency motor drive controller.

31. The vehicle of claim 30, wherein:
the means for supporting a load further comprises, a chassis;
the means for propelling the means for carrying a load comprises a drive wheel;
the means for recharging the stored electrical power further comprises a generator; and
the means for storing electrical power comprises a battery;
the means for converting the first and second rotational forces to the means for propelling comprises a transmission.

32. The vehicle of claim 24, wherein the first variable frequency motor drive controller and the second variable frequency motor drive controller are responsive to a torque control positioned and arranged to receive input from an operator.

33. A vehicle comprising:
a chassis,
a drive wheel carrying at least a portion of the chassis;
a first electrical power storage mounted on the chassis;
a first variable frequency motor drive controller positioned and arranged to receive direct current power from the first electrical power storage;
a second variable frequency motor drive controller positioned and arranged to receive direct current power from the first electrical power storage, synchronized to the first variable frequency motor drive controller;
a first stator positioned and arranged to receive a first variable frequency alternating current control signal from the first variable frequency motor drive controller;
a second stator positioned and arranged to receive a second variable frequency alternating current control signal from the second variable frequency motor drive controller;
a first inductive rotor responsive to the first stator and rigidly joined to the shaft;
a second inductive rotor responsive to the second stator and rigidly joined to the shaft; and
a transmission coupling the shaft to the drive wheel.

34. The vehicle of claim 33, wherein:
the first stator further comprises a plurality of stator laminates stacked together;
the second stator further comprises a plurality of stator laminates stacked together;
the first inductive rotor further comprises a plurality of rotor laminates stacked together;
the second inductive rotor further comprises a plurality of rotor laminates stacked together; and
the first and second stators and the first and second inductive rotors each have a stacking factor of at least 98 percent.

35. The vehicle of claim 34, wherein:
the plurality of stator laminates of the first stator are rotated approximately 180 degrees relative to adjacent stator laminates;
the plurality of stator laminates of the second stator are rotated approximately 180 degrees relative to adjacent stator laminates
the plurality of rotor laminates of the first inductive rotor are rotated approximately 180 degrees relative to adjacent rotor laminates; and
the plurality of rotor laminates of the second inductive rotor are rotated approximately 180 degrees relative to adjacent rotor laminates.

36. The vehicle of claim 35 wherein the first and second inductive rotors each comprises a squirrel cage rotor.

37. The vehicle of claim 33 further comprising:
electrical power generator mounted on the chassis providing direct current electrical power to the first and second variable frequency motor drive controllers.

38. The vehicle of claim 37, wherein:
the electrical power storage comprises a battery; and
the electric power generator comprises a propane generator.

39. The vehicle of claim 38, wherein the first motor drive controller and the second motor drive controller are responsive to a torque control positioned and arranged to receive input from an operator.

40. The vehicle of claim 39, further comprising:
An auxiliary electric motor, mounted on the chassis, powering auxiliary systems.

* * * * *

UNITED STATES PATENT AND TRADEMARK OFFICE
CERTIFICATE OF CORRECTION

| | | |
|---|---|---|
| PATENT NO. | : 8,550,196 B2 | Page 1 of 1 |
| APPLICATION NO. | : 13/394206 | |
| DATED | : October 8, 2013 | |
| INVENTOR(S) | : Robert Ross | |

It is certified that error appears in the above-identified patent and that said Letters Patent is hereby corrected as shown below:

In the Specification

Col. 1, line 38, omitted text should be added following the sentence, and the lines should read:

temperature is reduced. Additionally, the overall lifetime of a motor's iron and insulation is decreased by 50% for every 10 degrees Fahrenheit the motor's operating temperature is increased.

Col. 11, line 66 to Col. 12, line 4, should be replaced with corrected text, and the lines should read:

In a further example embodiment, the first and second motor units are not operated above a maximum temperature exceeding 120 degrees Fahrenheit. In another example, the motor units are not operated at higher than 101.48K lines per square inch in the back iron to keep operating temperatures below 120 degrees Fahrenheit.

Col. 12, lines 9 to 13, should be replaced with corrected text, and the lines should read:

In further examples, the tooth density of the stator is 75.8K lines per square inch. The air gap density is 51.88K lines per square inch. And the back iron density is 101.48K lines per square inch. These densities are with the motor operated at 320 volts and 60 hertz.

Col. 12, line 29, omitted text should be added following the sentence, and the lines should read:

oxygen free atmosphere is pure nitrogen. In one such example, the oxygen free atmosphere is pure nitrogen with a 6 hour cold soak time and then oven dried.

Signed and Sealed this
Eleventh Day of February, 2014

Michelle K. Lee
*Deputy Director of the United States Patent and Trademark Office*